Patented May 31, 1932

1,860,560

UNITED STATES PATENT OFFICE

THOMAS WARBURTON, OF MANCHESTER, ENGLAND

PRODUCTION OF THE ACID SULPHATE AND THE NORMAL SULPHATE OF ALPHA-NAPHTHYLAMINE

No Drawing. Application filed June 1, 1929, Serial No. 367,839, and in Great Britain June 19, 1928.

This invention relates to an improved method of preparing the acid sulphate (hydrosulphate) or the normal sulphate of alpha-naphthylamine.

Hitherto the acid sulphate has been prepared by fusing alpha-naphthylamine and sulphuric acid together at a relatively high temperature which tends to the formation of a certain amount of tar and other by-products. The object of the present invention is to reduce this tendency and create a better and cheaper process for the manufacture of the acid sulphate and of the normal sulphate.

It consists in treating a given weight of alpha-naphthylamine with the approximate molecular proportion of sulphuric acid in strength not over 100% $H_2SO_4$ in a suitable mixing or grinding machine without the application of heat, other than heat generated during the reaction thereto.

Although the reaction can be carried out when the proportion of sulphuric acid to the alpha-naphthylamine is slightly below the molecular proportion therefor, it is advisable that the proportion of sulphuric acid should not be below the necessary molecular proportion but preferably slightly in excess therefor to avoid the presence of excess naphthylamine in the finished product.

As an example for the production of the acid sulphate 143 grammes of alpha-naphthylamine are placed in a suitable mixing or grinding machine, which may or may not be water cooled, and 100 grammes of sulphuric acid (100% $H_2SO_4$) are then run in the temperature being kept as low as is necessary and the whole mixed and ground together.

Instead of using sulphuric acid 100% $H_2SO_4$ strengths of lesser percentage than 100% may be employed in which cases the equivalent weight of the sulphuric acid would be employed. Thus if sulphuric acid 70% $H_2SO_4$ were employed 143 grammes of same would be used i. e. equal parts by weight of the sulphuric acid and alpha-naphthylamine are employed.

The invention can also be carried out by adding the alpha naphthylamine to the sulphuric acid in a suitable mixing or grinding machine. In this method 100 grammes of sulphuric (100% $H_2SO_4$)—or equivalent amount of other strength—is placed in the machine, which may or may not be water cooled and 143 grammes of alpha-naphthylamine added thereto, the temperature being kept as low as is necessary, and the whole mixed and ground together.

The normal sulphate of alpha-naphthylamine is prepared in the same manner as described above for the preparation of the acid sulphate but half the quantity of sulphuric acid is employed.

Moreover the acid sulphate or alpha-naphthylamine may be prepared from the normal sulphate by treating a given weight of the normal sulphate with the approximate molecular proportion of sulphuric acid. As an example 192 grammes of the normal sulphate of alpha-naphthylamine (100%) are mixed with 50 grammes of sulphuric acid (100% $H_2SO_4$) the temperature being kept as low as is necessary.

Instead of using sulphuric acid 100% $H_2SO_4$ strengths of lesser percentage than 100% may be employed in which case equivalent weights of the sulphuric acid would be employed.

What I claim as my invention and desire to protect by Letters Patent is:—

1. Method of preparing sulphate of alpha-naphthylamine which consists in placing a given weight of alpha-naphthylamine in a mixing machine, adding thereto the approximate molecular proportion of sulphuric acid of a strength not exceeding 100% $H_2SO_4$ and continuously mixing the alpha-naphthylamine as the sulphuric acid is being added thereto without drying and without the addition of external heat.

2. Method of preparing the acid sulphate of alpha-naphthylamine in a mixing machine, adding thereto the approximate molecular proportion of sulphuric acid of a strength not exceeding 100% $H_2SO_4$ and continuously mixing the alpha-naphthylamine as the sulphuric acid is being added thereto, without drying and without the addition of external heat.

3. Method of preparing the acid sulphate of alpha-naphthylamine which consists in placing a given weight of alpha-naphthylamine in a mixing machine, adding thereto the approximate molecular proportion of sulphuric acid of a strength not exceeding 100% $H_2SO_4$, continuously mixing the alpha-naphthylamine as the sulphuric acid is being added thereto, and cooling the mass during the period of mixing.

4. Method of preparing the acid sulphate of alpha-naphthylamine which consists in placing a given weight of the normal sulphate of alpha-naphthylamine in a mixing machine, adding thereto the approximate molecular proportion of sulphuric acid of a strength not exceeding 100% $H_2SO_4$, continuously mixing the alpha-naphthylamine as the sulphuric acid is being added thereto, and cooling the mass during the period of mixing.

In testimony whereof I have hereunto set my hand.

THOMAS WARBURTON.